United States Patent Office 3,533,736
Patented Oct. 13, 1970

3,533,736
1,2,3,5,6,7,4,8-HEXATHIADIPHOSPHOCANE-4,8-DI-
THIOXO-4,8-DITHIOLIC ACID AND ITS SALTS
Herbert W. Roesky, Gottingen, Germany, assignor to E. I.
du Pont de Nemours and Company, Wilmington, Del.,
a corporation of Delaware
No Drawing. Filed Aug. 3, 1966, Ser. No. 569,809
Int. Cl. C01b 25/28
U.S. Cl. 23—106        9 Claims

ABSTRACT OF THE DISCLOSURE

Described and claimed are 1,2,3,5,6,7,4,8-hexathiadi-
phosphocane-4,8-dithioxo-4,8-dithiolic acid and its salts.
These novel compounds are useful chemical reducing
agents.

Field of the invention

This invention relates to a new inorganic acid and its
salts and to their preparation.

Details of the invention

The novel compounds of this invention are the acid
$H_2P_2S_{10}$ and its salts. These compounds have the formula
$M_a^{m+}(P_2S_{10})_b$ where M is any cation, i.e., hydrogen, a
metal, $NH_4$, or a loweralkyl or phenyl-substituted ammo-
nium, arsonium, or phosphonium ion, and $m$ is the va-
lence of M. When $m$ is an odd number, i.e., 1 or 3, $a=2$
and $b=m$. When $m$ is an even number, i.e., 2 or 4, $a=1$
and $$b = \frac{m}{2}$$

The alkali metal salts of this invention are prepared
by the reaction of an alkali metal azide with $P_4S_{10}$ in
the presence of the dimethyl ether of ethylene glycol. By
alkali metal is meant Li, Na, K, Rb, Cs, or Fr. The reac-
tion proceeds at temperatures in the range from 0 to
100° C. Pressure is not a critical factor in the process
and ambient pressures are satisfactory.

The molar ratio in which the alkali metal azide and
$P_4S_{10}$ are brought together in carrying out the reaction
may be varied widely, i.e., from 1:20 to 20:1. Molar
ratios in the range of 1:2 to 2:1 are preferred.

The free acid $H_2P_2S_{10}$, is obtained by the reaction of
an alkali metal salt prepared as described above, with a
cation-exchange resin in acid form. Other salts are pre-
pared by metathesis.

In the compounds of this invention, the divalent
$P_2S_{10}$ anion is considered to have the structure

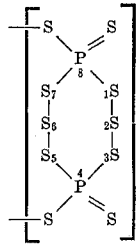

and is referred to as the 1,2,3,5,6,7,4,8-hexathiadiphos-
phocane-4,8-dithioxo-4,8-dithiolate dianion.

The products of this invention are all useful as chemi-
cal reducing agents. Thus, in neutral or alkaline systems
they reduce permanganate to $MnO_2$, and in acid systems
they reduce permanganate to manganous ion. Specifically,
an aqueous solution of disodium 1,2,3,5,6,7,4,8-hexathi-
adiphosphocane-4,8-dithioxo-4,8-dithiolate decolorizes an
aqueous solution of potassium permanganate. The free
acid and the soluble salts of this invention are also useful
for removing large cations from solution as shown in Ex-
ample 2 below.

Specific embodiments of the invention

In the following examples parts are by weight unless
otherwise noted.

EXAMPLE 1

In a glass reactor a mixture of 3.9 g. $NaN_3$, 4.4 g. $P_4S_{10}$,
and 50 ml. of ethylene glycol dimethyl ether (glyme) was
stirred under nitrogen. The exothermic reaction heated
the mixture to 35° C. within 15 minutes. The reaction
mixture was then heated an additional 15 minutes at 40°
C., cooled to room temperature and filtered. Glyme was re-
moved from the filtrate under reduced pressure leaving
a colorless viscous liquid which was dissolve in water to
obtain a solution of disodium 1,2,3,5,6,7,4,8-hexathiadi-
phosphocane-4,8-dithioxo-4,8-dithiolate, $Na_2P_2S_{10}$.

EXAMPLE 2

The solution obtained in Example 1 was filtered to re-
move a trace of sulfur which separated. To the filtrate
was added an aqueous solution of tetra-n-propylammo-
nium bromide. The white solid which precipitated was
collected by filtration and recrystallized from methanol
to yield 0.8 g. of tetra-n-propylammonium 1,2,3,5,6,7,4,8-
hexathiadiphosphocane-4,8-dithioxo-4,8-dithiolate

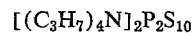

in the form of colorles crystals which darkened slightly
at 112–153° C. and melted with decomposition at 229–
230° C.

Analysis.—Calcd. for $C_{24}H_{56}N_2P_2S_{10}$ (percent): C,
38.20; H, 7.42; N, 3.72; P, 8.22; S, 42.4. Found (percent):
C, 37.92; H, 7.56; N, 3.86; P, 8.34; S, 43.27.

When an aqueous solution of $Na_2P_2S_{10}$, obtained as
in Example 1, is passed through a column of cation-ex-
change resin in acid form and washed through with ad-
ditional water, an aqueous solution of the free acid
$H_2P_2S_{10}$, 1,2,3,5,6,7,4,8-hexathiadiphosphocane - 4,8 - di-
thioxo-4,8-dithiolic acid, is obtained. The pure acid is iso-
lated as a colorless liquid by removal of water, for ex-
ample, by evaporation or distillation.

When tetramethylammonium chloride, tetraethylam-
monium bromide, tetra-n-butylammonium chloride, tetra-
phenylarsonium chloride, and methyl triphenylphospho-
nium bromide are substituted for tetra-n-propylammo-
nium bromide in the procedure of Example 2, the corre-
sponding tetramethylammonium, tetraethylammonium,
tetra-n-butylammonium, tertaphenylarsonium, and methyl
triphenylphosphonium 1,2,3,5,6,7,4,8-hexathiadiphospho-
cane-4,8-dithioxo-4,8-dithiolates are obtained as colorless
crystalline solids.

When an aqueous solution of the free acid $H_2P_2S_{10}$,
1,2,3,5,6,7,4,8 - hexathiadiphosphocane - 4,8 - dithioxo-
4,8-dithiolic acid, reacts with the oxide or hydroxide of
any metal, the corresponding metal salt is obtained. Thus,
calcium oxide yields calcium 1,2,3,5,6,7,4,8-hexathiadi-
phosphocane-4,8-dithioxo-4,8-dithiolate, barium hydroxide
yields barium 1,2,3,5,6,7,4,8 - hexathiadiphosphocane-4,8-
diothioxo-4,8-dithiolate, and zinc oxide yields zinc 1,2,3,5,
6,7,4,8 - hexathiodiphosphocane - 4,8 - dithioxo-4,8-dithio-
late. Operable metals include all elements with atomic
numbers of 3, 4, 11–13, 19–32, 37–51, 55–84, 87–102,
and above.

It is to be understood that the formula $P_4S_{10}$ used here-
in refers to phosphorus pentasulfide, $P_4S_{10}$ being the pres-
ently accepted formula for this compound rather than the
older formula $P_2S_5$.

The foregoing detailed description has been given for
clarity of understanding only an no unnecessary limita-
tions are to be understood therefrom. The invention is not limited to the exact details shown and described, for obvious modifications will be apparent to those skilled in the art.

The embodiments of the invention in which an exclusive property or privilege is claimed are as follows:

1. A compound of the formula

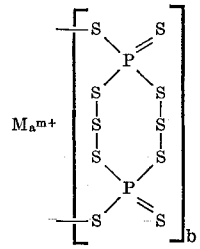

wherein M is a cation of valence $m$; and when $m$ is an odd number, $a$ is 2 and $b$ equals $m$; and when $m$ is an even number, $a$ is 1 and $b$ equals $m/2$.

2. Compounds of claims 1 wherein M is selected from the class consisting of hydrogen, metal, ammonium, lower-alkyl and phenyl-substituted ammonium, arsonium and phosphonium ions.

3. Compounds of claim 1 wherein M is an alkali metal.

4. 1,2,3,5,6,7,4,8 - hexathiadiphosphocane - 4,8 - dithioxo - 4,8 - dithiolic acid, the compound of claim 1 where M is hydrogen, $a=2$, and $b=1$.

5. Disodium 1,2,3,5,6,7,4,8 - hexathiadiphosphocane-4,8-dithioxo - 4,8 - dithiolate, the compound of claim 1 wherein M is sodium and $a=2$, and $b=1$.

6. Tetra-n-propylammonium 1,2,3,5,6,7,4,8 - hexathiadiphosphocane-4,8-dithioxo-4,8-dithiolate, the compound of claim 1 wherein M is tetra-n-propylammonium, $a=2$ and $b=1$.

7. Process for preparing compounds of claim 1 wherein M is an alkali metal cation which comprises reacting an alkali metal azide with $P_4S_{10}$ in the presence of the dimethyl ether of ethylene glycol at 0° to 100° C.

8. Process of claim 7 in which the reaction is effected in a temperature range of from 0° to 100° C. and in a mole ratio of azide to $P_4S_{10}$ of 1:20 to 20:1.

9. Process for preparing the acid of claim 4 which comprises contacting a solution of an alkali metal salt of claim 3 with an ion-exchange resin in its acidic form.

References Cited

UNITED STATES PATENTS

| | | | |
|---|---|---|---|
| 3,197,404 | 7/1965 | Berger et al. | 252—400 |
| 2,744,083 | 5/1956 | Moody et al. | 252—400 |
| 2,742,431 | 4/1956 | Bishop | 252—400 |

OTHER REFERENCES

Mosurski, Synthesis of Inhibitors and Additives for Lubricating Oils, Chem. Abs., vol. 52, No. 7675(a), 1958.

LELAND A. SEBASTIAN, Primary Examiner

U.S. Cl. X.R.

23—105, 315, 316, 139, 343, 344, 345, 346; 260—440, 502.4, 502.5